I. PFEIFER & E. SZARVASY.
PROCESS FOR THE PRODUCTION OF HALOGEN DERIVATIVES OF HYDROCARBONS.
APPLICATION FILED APR. 3, 1911.
1,012,149.
Patented Dec. 19, 1911.
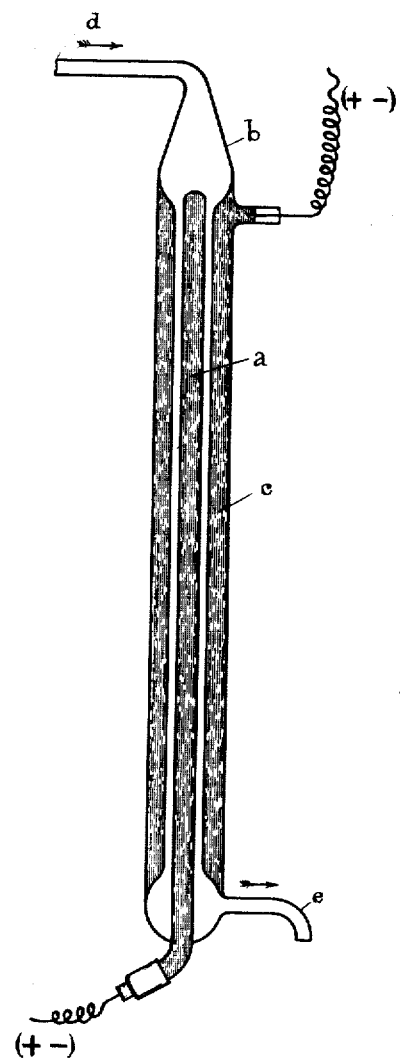
WITNESSES
INVENTORS
IGNAC PFEIFER and EMERICH SZARVASY
BY
ATTORNEY

UNITED STATES PATENT OFFICE.

IGNAC PFEIFER AND EMERICH SZARVASY, OF BUDAPEST, AUSTRIA-HUNGARY.

PROCESS FOR THE PRODUCTION OF HALOGEN DERIVATIVES OF HYDROCARBONS.

1,012,149. Specification of Letters Patent. Patented Dec. 19, 1911.

Application filed April 3, 1911. Serial No. 618,692.

*To all whom it may concern:*

Be it known that we, IGNAC PFEIFER and EMERICH SZARVASY, subjects of the King of Hungary, residing at Budapest, in the Empire of Austria-Hungary, have invented certain new and useful Improvements in Processes for the Production of Halogen Derivatives of Hydrocarbons, of which the following is a specification.

It has hitherto been known that it is possible to start reactions between saturated or non-saturated hydrocarbons and halogens by means of an influencing agent, as light, heat or contact substances but under such conditions that the reaction mostly took place very slowly or in an irregular manner. Experiments have now shown that these reactions can be regulated or accelerated by the silent electric discharge—namely either alone or with the aid of an influencing agent, as light, heat or contact substances—in such manner that it becomes possible to manufacture chlorinated products from hydrocarbons on an industrial scale. The reaction can be easily controlled so that it takes place in a quantitative manner, that is to say, that the products leaving the discharge chamber, do not contain any material quantities of halogens or of unmodified hydrocarbon. If for instance a mixture of 1 volume of $CH_4$ and 1 volume of $Cl_2$ is passed through the discharge chamber into a cooling device, there will collect in the latter a mixture of $CCl_4$, $CHCl_3$, $C_2Cl_4$ and $C_2Cl_6$, while the more volatile products such as HCl, chlormethyl, escape in the form of gas and can be collected separately. The course of the reaction can be moderated by the addition to the reaction mixture of a neutral gas; on the other hand, products which have not been sufficiently highly halogenized, can be driven repeatedly, if necessary, through the discharge chamber. Of course, instead of pure hydrocarbons, mixtures of the same could be used, and in place of pure halogens, mixtures of these with each other or with substances generating halogens.

It is understood that it is not intended to use X-rays or cathode-rays as influencing agents, because it is not possible to control the reaction between hydrocarbons and halogens if these rays are used together with the silent discharge.

Any apparatus producing silent discharges in a discharge chamber may be used; one of the simplest forms of this type is shown in the annexed drawing.

With reference to the drawing, the apparatus comprises a closed inner tube —*a*— and an outer tube —*b*—, the annular, double walled space —*c*— of which is closed. The tube —*a*— and space —*c*— are filled with diluted sulfuric acid and connected respectively to the poles of an inductor. The gas mixture is led through —*d*— in the apparatus, passes through the narrow space between —*a*—and —*c*—, is during this passage exposed to the silent discharge between —*a*— and —*c*—, and exits at —*e*— with the products of the reaction.

What we claim and desire to secure by Letters Patent is:—

1. A process for the production of halogen derivatives of hydrocarbons which comprises subjecting to the action of the silent electric discharge a mixture of hydrocarbon in the form of vapor or gas and a halogen.

2. A process for the production of halogen derivatives of hydrocarbons, which comprises subjecting to the action of the silent electric discharge with the aid of an influencing agent, a mixture of hydrocarbon, in the form of vapor or gas, and a halogen.

In testimony whereof we hereby affix our signatures in presence of two witnesses.

IGNAC PFEIFER.
EMERICH SZARVASY.

Witnesses:
EUGENE HARRANY,
CHARLES MESSINGER.